United States Patent [19]

Cunningham

[11] 3,879,843
[45] Apr. 29, 1975

[54] METHOD FOR ASSEMBLING A CABLE JOINT

[75] Inventor: Francis V. Cunningham, Western Springs, Ill.

[73] Assignee: Joslyn Mfg. and Supply Co., Chicago, Ill.

[22] Filed: Dec. 7, 1973

[21] Appl. No.: 422,714

Related U.S. Application Data

[62] Division of Ser. No. 163,863, July 19, 1971, Pat. No. 3,781,964.

[52] U.S. Cl. ............................. 29/628; 29/630 F
[51] Int. Cl. ........................................ H01r 43/00
[58] Field of Search ........ 29/628, 629, 630; 339/59, 339/60, 61, 94; 174/91, 93, 73 R, 84 R

[56] References Cited
UNITED STATES PATENTS

| | | | |
|---|---|---|---|
| 2,494,666 | 1/1950 | Medvetz | 174/91 |
| 2,621,228 | 12/1952 | Tompers | 174/93 |
| 3,485,935 | 12/1969 | Kreuger | 174/73 R |
| 3,558,799 | 1/1971 | Lee | 174/73 R |
| 3,580,986 | 5/1971 | Misare | 174/73 R |
| 3,612,746 | 10/1971 | Sankey | 174/73 R |
| 3,656,084 | 4/1972 | Malia | 339/60 R |
| 3,692,922 | 9/1972 | Sugimoto et al. | 174/73 R |

FOREIGN PATENTS OR APPLICATIONS 312,494  5/1929  United Kingdom............... 174/84 R Primary Examiner—C. W. Lanham
Assistant Examiner—James R. Duzan
Attorney, Agent, or Firm—Mason, Kolehmainen, Rathburn & Wyss

[57] ABSTRACT

A method for assembling a cable joint for electrically connecting a plurality of high voltage cables includes the steps of stripping a first portion of an end of a first cable of the plurality of high voltage cables to expose a desired length of the central conductor of the first cable and stripping a first portion of an end of a second cable of the plurality of cables to expose a desired length of the central conductor of the second cable. Further, the method includes the steps of placing a first, elongated, dielectric member over a portion of the end of the first cable to thereby surround the portion with the first member and placing a second, elongated, dielectric member over a portion of the end of the second cable to thereby surround the portion with the second member. Additionally, the method includes the steps of placing an elongated unitary means for housing the electrically interconnected ends of the first and second cables in a first position over one of the first and second cables in which position the housing means surrounds a portion of that one cable, electrically interconnecting the central conductors of the first and second cables and moving the housing means from the first position to a second position which the housing means surrounds the electrically interconnected central conductors of the first and second cables.

15 Claims, 17 Drawing Figures

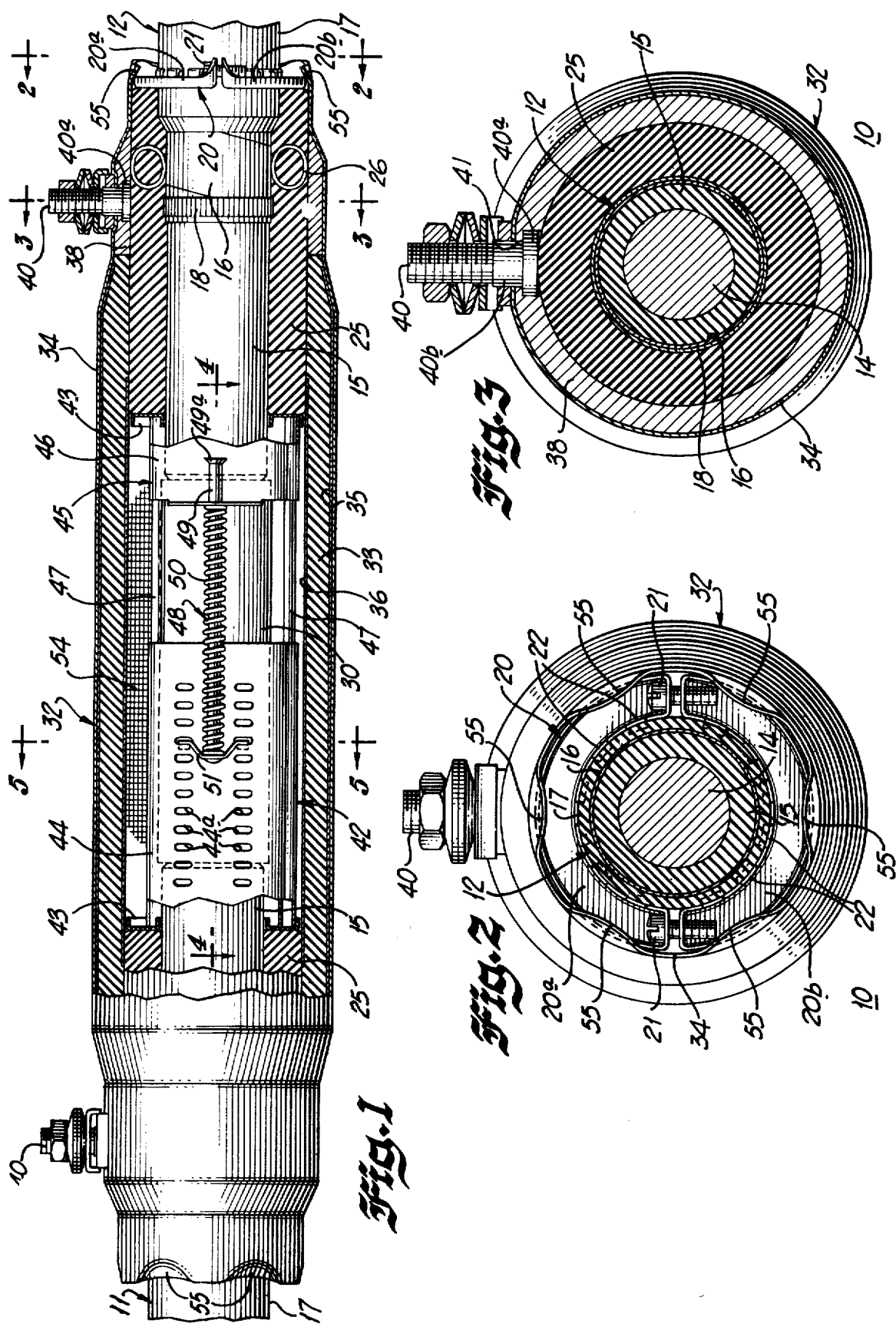

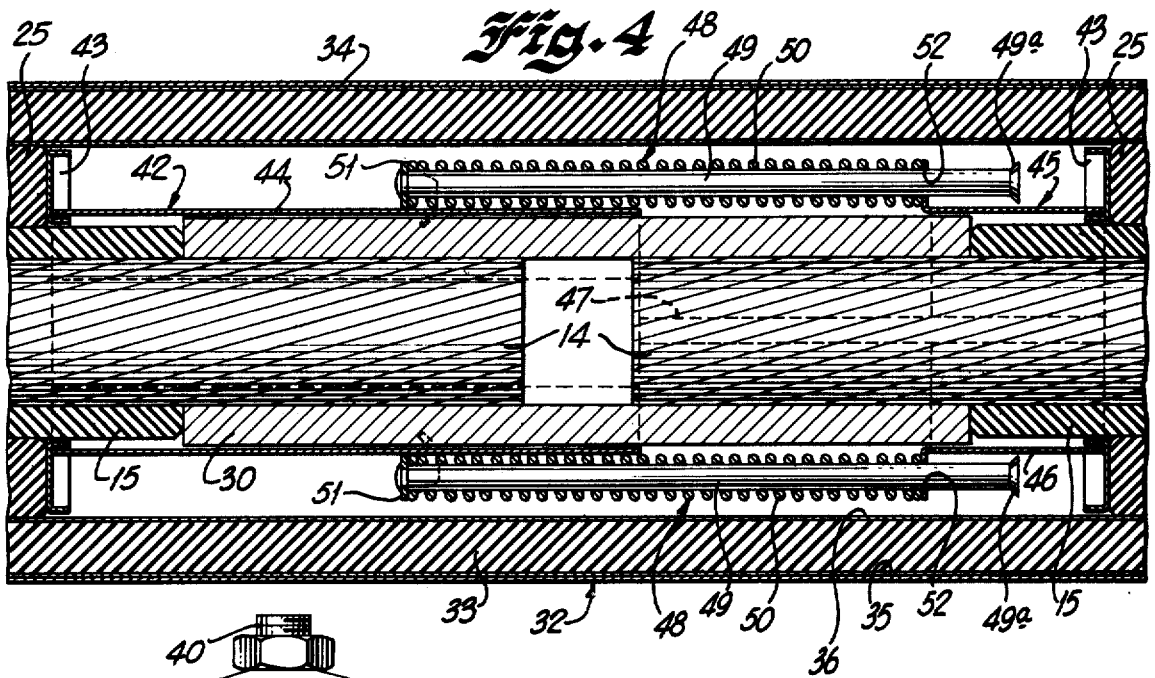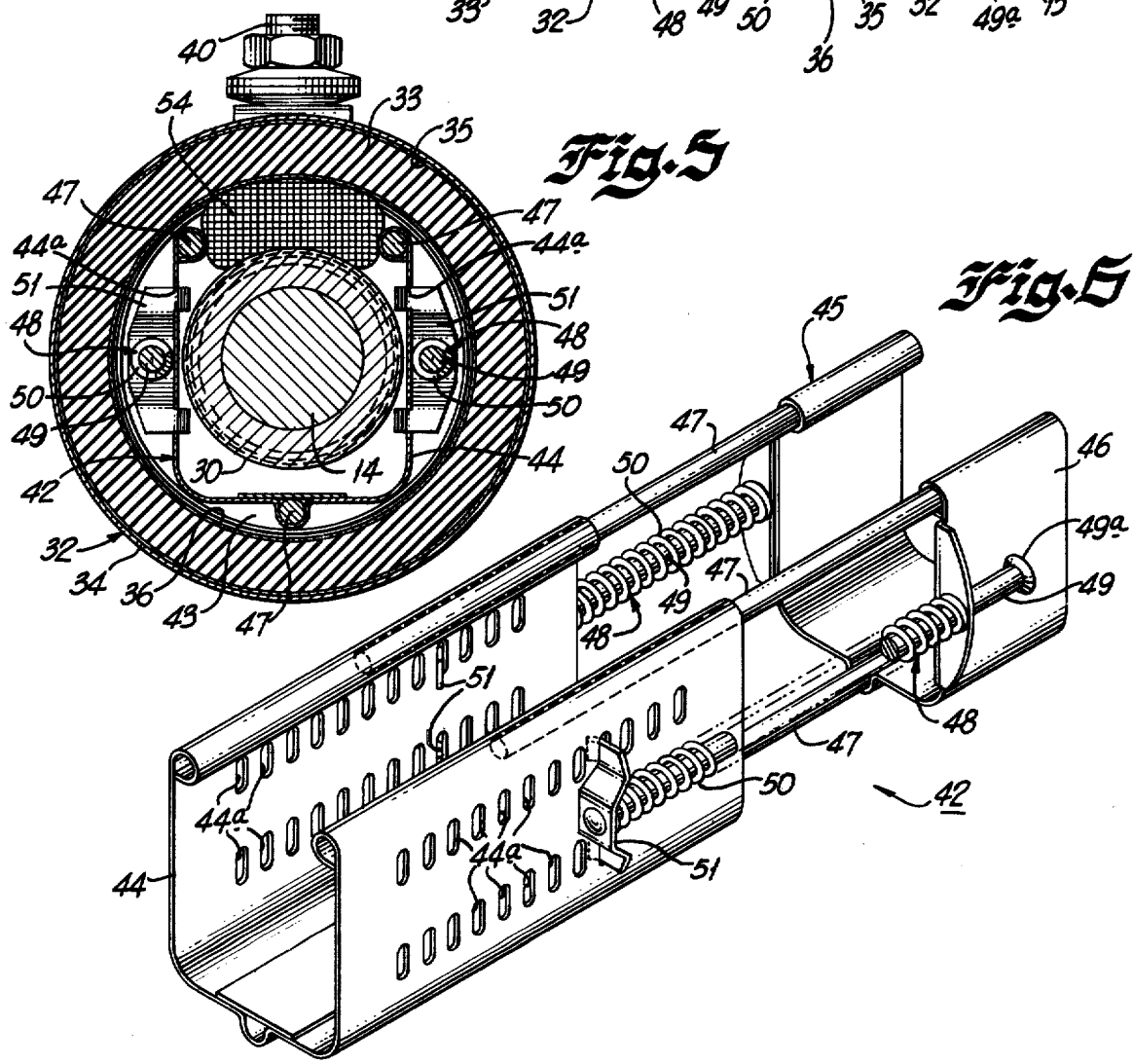

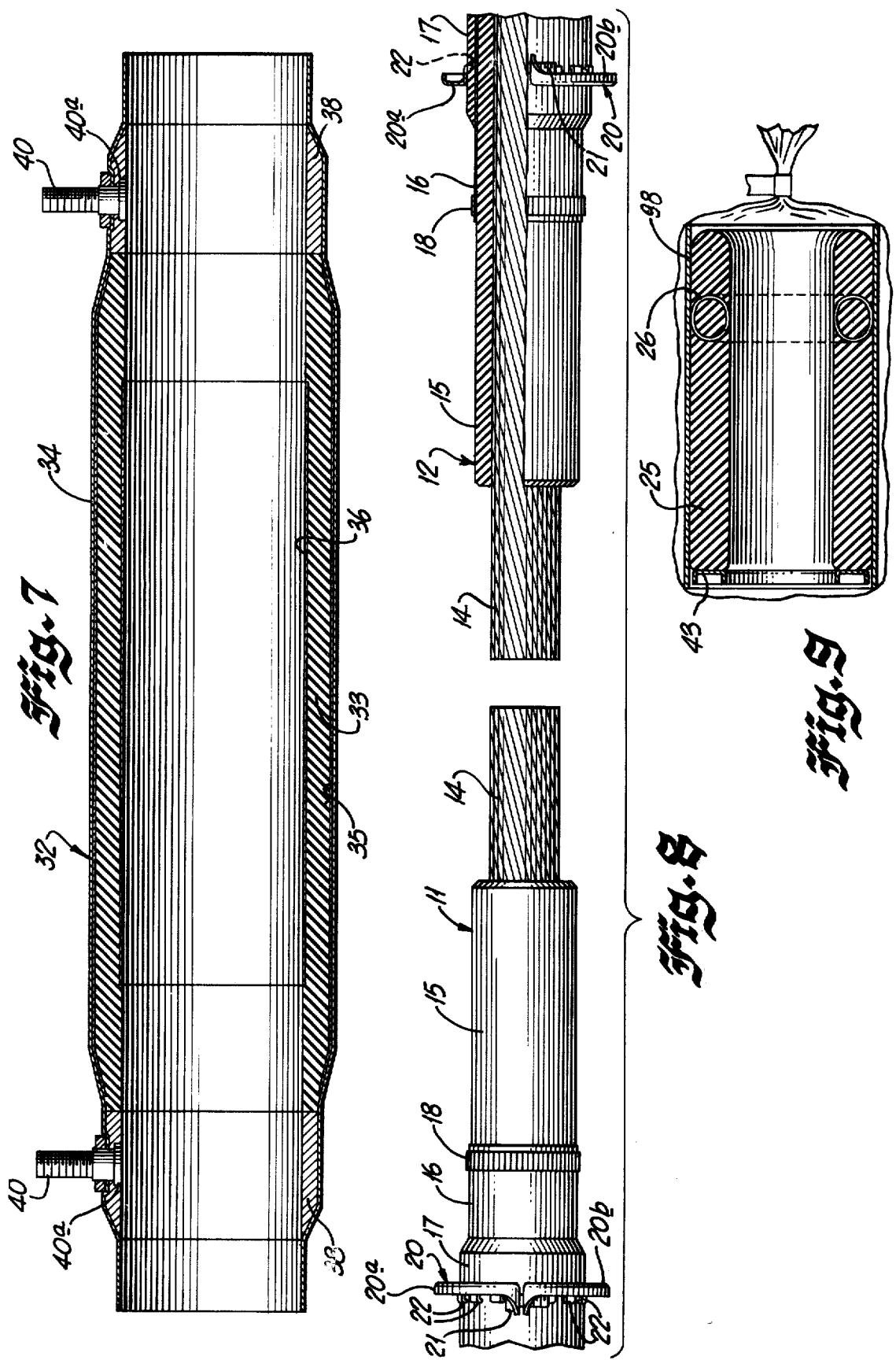

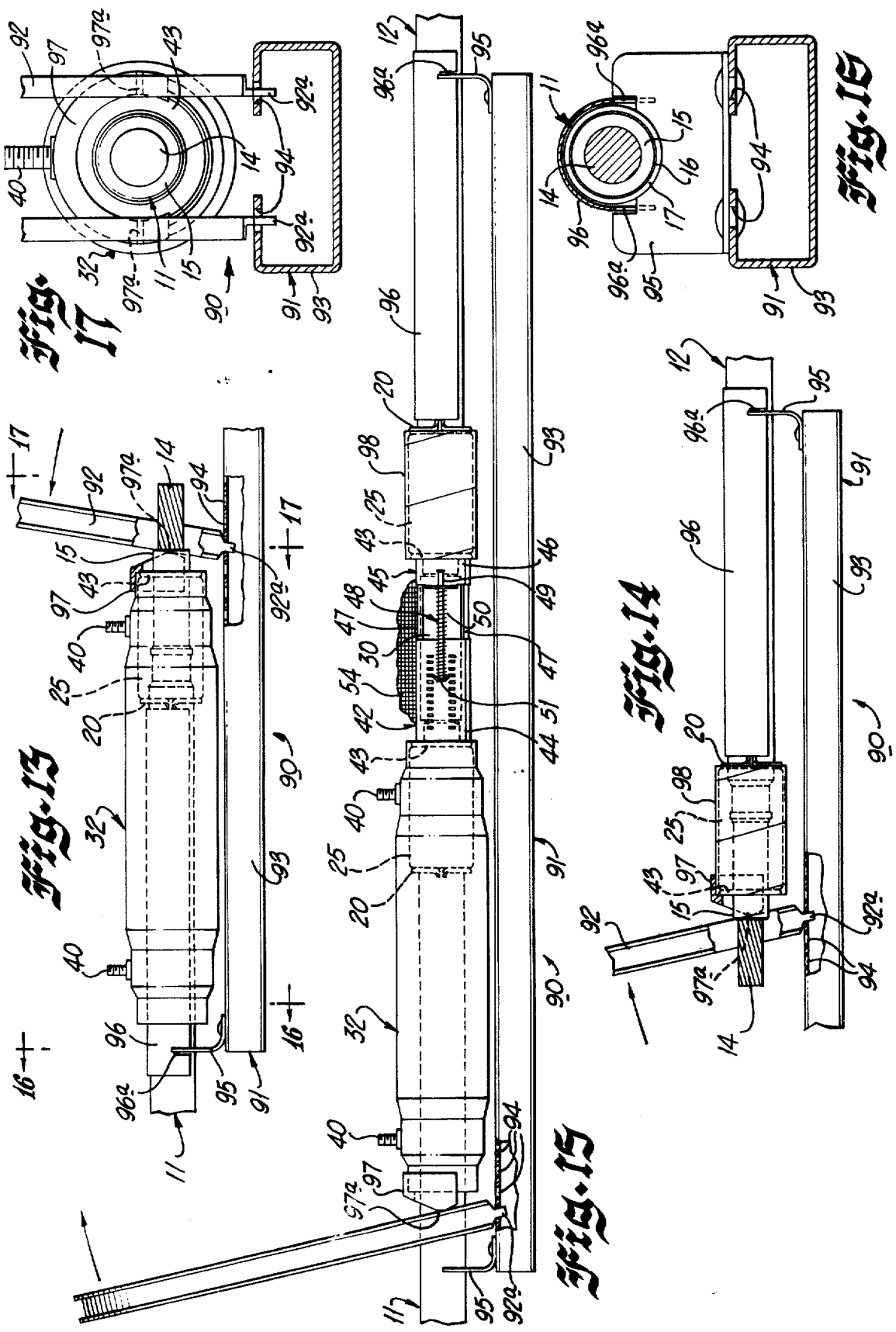

METHOD FOR ASSEMBLING A CABLE JOINT

This is a divisional application of application Ser. No. 163,863, filed 19 July 1971, now U.S. Pat No. 3,781,964.

The present invention relates to an improved method and apparatus for assembling a cable coupling onto the juxtaposed end portions of electrical cables, and more particularly relates to an improved method and apparatus for assembling a cable coupler of the type having a pair of tubular elastomeric insulating members.

Various types of high voltage cables are in use. One common type, referred to as concentric neutral, comprises a cable having a central conductor, suitable shielded insulation around the conductor, an outer conductive plurality of spirally wound individual wires on the outer shielding defining a shielding drain system of individual neutral wires. Yet another type of high voltage cable includes a central conductor covered with a suitable shielded insulation and having a metallic shielding drain or grounding tape wrapped on the shielded insulation. A protective insulating jacket covers the metallic grounding tape. Corona problems develop whenever sufficient electrical voltage gradient is present between spaced conducting elements, separated by air spaces or air pockets.

The prior art includes serveral devices for joining or splicing together high voltage cables. One such device is disclosed in U.S. Pat. No. 3,656,084. A major disadvantage of the device of this prior art patent is that it necessarily employs a split housing formed of two housing members 20 and 26 (FIGS. 1 through 3, 7 and 8) rather than the more simple and less expensive single housing of the present invention.

An additional disadvantage of the split housing of above-identified prior art patent lies in the requirement of providing the irregularly formed or shaped portions of the insulating elastomer 90 and of the conductive elastomer 92 of the first housing member 20 and the irregularly formed or shaped portions of the inner portion 100 and the outer portion 102 of the second housing member 26 in the vicinity of the junction 160 of the first and second housing members 20 and 26. These irregularly formed or shaped portions are required in order to reduce the tendency for electrical stresses to become unduly concentrated at the vicinity of the junction 160 of the first and second housing members 20 and 26.

The present invention has for an object the provision of a new and improved corona-free coupling assembly for use in connecting or splicing together high voltage cables of the type generally used in high voltage underground power distribution systems and the like.

Another object of the present invention is the provision of a new and improved apparatus for assembling a cable coupler onto juxtaposed ends of high voltage electrical cable.

Yet another object of the present invention is the provision of a new and improved method for assembling a cable coupler on high voltage electrical cable.

Still another object of the present invention is the provision of a new and improved method for assembling a cable coupler of the type having a pair of tubular elastomeric insulating members under compressive radial stress within a tubular housing onto juxtaposed end portions of a high voltage cable.

Further objects and advantages of the present invention will become apparent as the following description proceeds, and the features of novelty which characterize the present invention will be pointed out with particularity in the claims annexed to and forming a part of the specification.

In accordance with the present invention, there is provided an improved jack for assembling a cable coupler of the type having a pair of tubular elastomeric insulating members under compressive radial stress within a tubular housing. The improved jack includes an elongated jack base provided with rows of holes along its surface, and at least one end support adjacent an end for receiving and positioning a cable end portion. A brace is provided which may be operatively associated with the end support for positioning a cable end. A jack lever is provided engageable with a hole or holes for applying mechanical leverage to components of the cable coupler.

The present invention also relates to an improved method for assembly of a cable coupler of the type having a pair of tubular elastomeric insulating members under compressive radial stress within a tubular housing onto juxtaposed end portions of two segments of high voltage cable by exposing a length of central conductor of each and a length of cable insulation of each. An elastomeric filler is radially restrained within an elongated housing, and is forced as a unit onto the end of one of the cables. A second radially restrained elastomeric filler is forced over the end of the other cable. The exposed central conductors of the two cables are then electrically and mechanically joined, and axial bias is applied to the confronting edges of the elastomeric fillers. The housing is then forced into a central position, removing the external radial restraint on the second elastomeric filler, and releasing or transferring the radial restraint to the inner surface of the housing.

Thus, there is provided a method and apparatus for assembling a cable coupler for high voltage cable. The progressive assembly of the components, and particularly of the elastomeric fillers, provides for progressive wiping and loading of the interfaces between the elastomeric fillers, the cable insulation, and the inner surface of the housing so as to provide void-free interfaces therebetween. Moreover, the axial bias provided continual loading of the elastomeric fillers so that good sealing relation and void-free interfaces are maintained during any thermal condition of the coupler.

For a better understanding of the present invention, reference may be had to the following detailed description taken in conjunction with the drawings in which:

FIG. 1 is a plan view, partly in broken away section, of an improved coupling assembly as applied to a metallic shielding tape type high voltage cable;

FIG. 2 is a cross sectional view of the coupling assembly of FIG. 1, taken along line 2—2 of FIG. 1;

FIG. 3 is a cross sectional view of the coupling assembly of FIG. 1, taken along line 3—3 of FIG. 1;

FIG. 4 is a fragmentary cross sectional view of the coupling assembly taken along line 4—4 of FIG. 1;

FIG. 5 is a fragmentary cross sectional view of the coupling assembly taken along line 5—5 of FIG. 1;

FIG. 6 is a perspective view of a biasing means used in the coupling assembly of FIG. 1;

FIG. 7 is a cross sectional view of the tubular housing of the coupling assembly of FIG. 1;

FIG. 8 is a side view of a metallic shielding tape type high voltage cable as prepared for assembly into the coupling assembly;

FIG. 9 illustrates one of the tubular insulating members as packaged during shipment;

FIG. 13 illustrates one step in the assembly of the coupling assembly onto the ends of adjacent high voltage cables;

FIG. 14 illustrates another step in the assembly of the coupling assembly onto the ends of adjacent high voltage cables;

FIG. 15 illustrates another step in the assembly of the coupling assembly onto the ends of adjacent high voltage cables;

FIG. 16 illustrates the assembly of FIG. 13, taken along line 16—16 of FIG. 13; and FIG. 17 illustrates the assembly of FIG. 13 taken along line 17—17 of FIG. 13.

Figure 12:
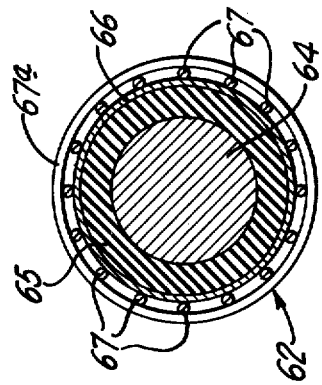
FIG. 12 is a cross sectional view of the assembly of FIG. 10 taken along line 12–12 of FIG. 10.

Referring now to the drawings, and particularly to the embodiment of FIGS. 1–9, therein is illustrated a coupling assembly 10 according to the present invention joining the ends of a pair of high voltage cables 11, 12. A typical metallic tape shielding drain type high voltage cable is illustrated in FIG. 8, with ends thereof prepared for joining with the coupling assembly 10 in accordance with the present invention. More specifically, the cables 11 and 12 each includes a central conductor 14 which may have conductive shielding material molded or taped to its surface to minimize voltage stressing of air space between the strands of the central conductor and solid insulation 15 which covers the central conductor 14. A conductive shielding material similar to that applied to the conductor is molded or wrapped over the insulation 15 to exclude all air from between the insulation and shielding. A thin metallic tape 16, often 4 or 5 mil copper, is then applied around the shield. The metallic tape 16, when grounded at the cable ends, keeps the shielding tape at near ground potential by draining the displacement current of the cable and by conducting fault currents to ground. A protective insulating jacket 17 covers the metallic tape 16. In preparing the cable end of the cable 11 for joining with an adjacent cable, the outer layers including the insulation are stripped back for a desired distance to expose a length of the central conductor 14. The protective jacket 17 and the shielding 16 are also stripped back to expose a length of insulation 15. The protective jacket is further stripped back, exposing the metallic tape. Securing tape 18, such as of copper foil, is wrapped around the loose end of the metallic tape to prevent unravelling thereof.

A retainer 20 is assembled on each of the cables 11 and 12 near the end of the protective insulating jacket 17. In the illustrated embodiment the retainer 20 is of the split ring type, having identical portions 20a, 20b held together by suitable fastening, such as screws 21. Each of the sections 20a, 20b, of the retainer 20 includes an axially extending outer flange 20c and a plurality of inner, axially extending fingers having radially inwardly extending projections 22 which grip into the protective insulating jacket 17, but which are too short to bite through the jacket into the metallic tape 16. Advantageously the retainer prevents creeping of the protective jacket 17 out of the coupling, retains the elastomeric fillers 25 within the housing, and further provides for locking in of the joined housing after assembly.

An elastomeric filler 25, generally sleeve-shaped and of electrically insulating material, is placed over each of the cable ends of the cables 11 and 12. The filler 25 includes a garter type conductive ring 26 embedded therein, the inner diameter of which engages the respective metallic tape 16 of each of the cables 11 and 12. The elastomeric filler 25 is positioned outwardly from the end of the cable against the retainer 20.

A connector sleeve 30 fits over the adjacent exposed ends of the central conductors 14 in the cables 11 and 12 and may be fastened thereto in any desired manner as by crimping, thereby establishing the electrical integrity of the cables 11 and 12.

The cable ends are enclosed within a suitable elongated or tubular housing 32 having an inner central sleeve 33 of insulating material such as an insulating epoxy enclosed within an external low resistance tubular casing 34 of stainless steel or other suitable material. The outer surface of the inner sleeve 33 is coated with a conducting epoxy coating 35, thus eliminating any possibility of voids or air spaces between the insulating material and ground. Additionally, an inner epoxy sleeve 36 of conducting material extends through the central portion of the inner sleeve 33 intermediate the ends thereof to prevent voids or air spaces between the conducting and insulating materials, and to prevent electrical stressing of the air space around the connector sleeve 30.

As previously indicated, the conductive ring 26 connects the casing 34 to the metallic tape 16 of the cables 11 and 12. Advantageously, a collector ring 38 of suitable electrically conductive material may be contained within the casing 34 outwardly of the inner sleeve 33 to provide electrical contact with the conductive ring 26 and to provide good electrical contact with suitable grounding studs 40, here shown with their heads 40a pressed into the collector ring 38. In assembly, a hole 41, FIG. 3 is drilled or otherwise formed in the collector ring 38; and the shank 40b of the stud 40 is force driven into the hole. Moreover the head 40a of the stud 40, which preferably is serrated or has an otherwise noncircular cross section, is also driven or die-cut into the collector ring by the mere continuation of the driving force applied to the shank. The head 40a will cut into the collector ring providing a secure connection. Thus, the collector ring 38 provides a heat sink for the grounding currents, and provides a low resistance, large area of contact with the grounding studs 40.

The elastomeric fillers 25 are maintained under axial bias to provide a continuing seal and air-free interfaces throughout the thermal operating conditions of the coupling assembly 10. Any suitable biasing means may be used; however, it has been found advantageous to provide a biasing arrangement which may be assembled after crimping of the conductor sleeve. To this end, there is provided a spring biasing assembly 42 compressed between cupped washers 43 for the elastomeric filler 25. More specifically, the spring biasing assembly 42 includes U-shaped slotted slide 44 having two rows of adjusting slots 44a on each face. Cooperating with the slotted slide 44 is a slide assembly 45 having a generally U-shaped body 46 and a plurality of slide rods 47 each slidably received within a suitable retaining portion of the slotted slide 44. A pair of spring assemblies 48, each including a guide rod 49, spring 50, and spring retainer clip 51, is compressed with the guide rod 49 extending through suitable guide openings 52 in the body 46, and the retainer clip 51 being adjustably positioned in a selected pair of the slots 44a in the slotted slide 44 so as to provide the desired compression in the spring 50. The free end 49a of the guide rod 49 extending through the respective guide opening 52 may be flared or turned out to prevent disassembly of the spring assemblies 48 from the body 46 during handling and shipping of the coupling assembly 10.

The free ends of the casing 34 are peened over, as illustrated at 55, to lock the housing 32 into position. Moreover, advantageously it will be seen that the grounded integrity of the system is maintained as between the metallic tape 16 on the respective cables 11 and 12, through the conductive rings 26, and conductive casing 34. Moreover, either or both ends of the housing 32 may be grounded through the grounding studs 40, as desired.

To prevent electrical stressing of the air space around the connector sleeve 30 and spring biasing assembly 42, it is necessary that the conductive coating 36 be at the same electrical potential as the internal components of the joint. Accordingly, suitable conductive material, such as a wad of copper mesh 54 is inserted within the air space making electrical contact between the connector sleeve 30, spring biasing assembly 42, and conductive coating 36.

From the foregoing description, it will be understood that there is provided a new and improved coupling assembly having a small diameter and length, and suitable for joining the ends of high voltage cable, particularly of the metallic tape drain type.

Figure 10:
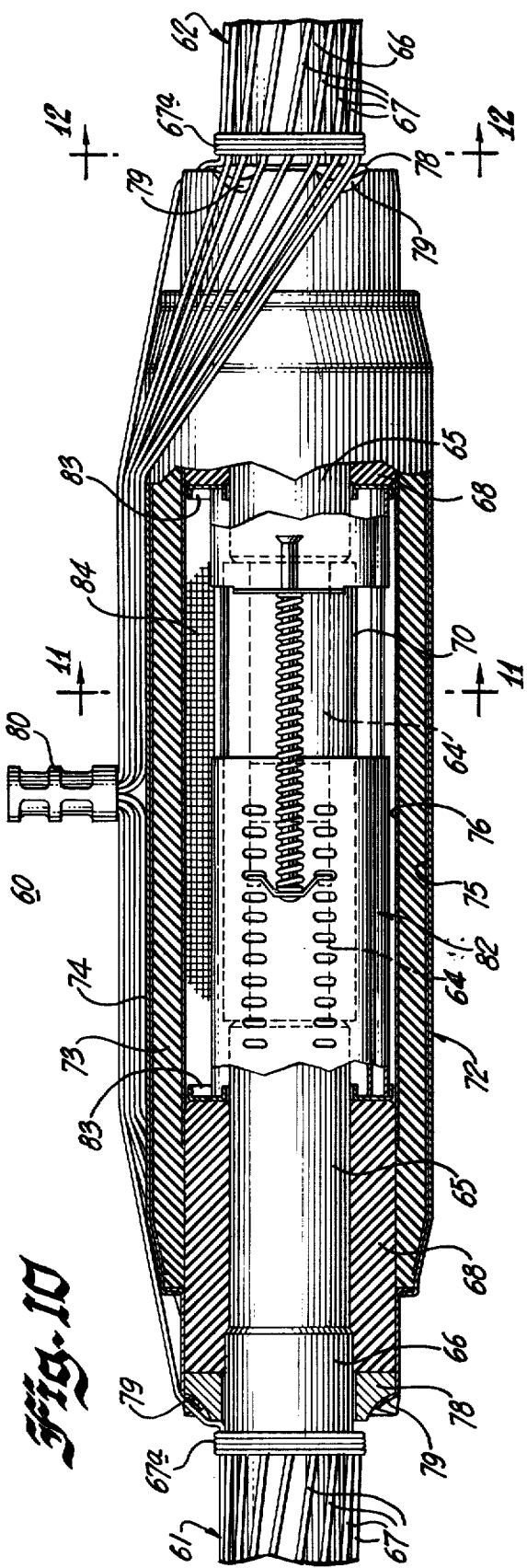
FIG. 10 is a coupling assembly according to the present invention as applied to a concentric neutral type of high voltage cable.
Figure 11:
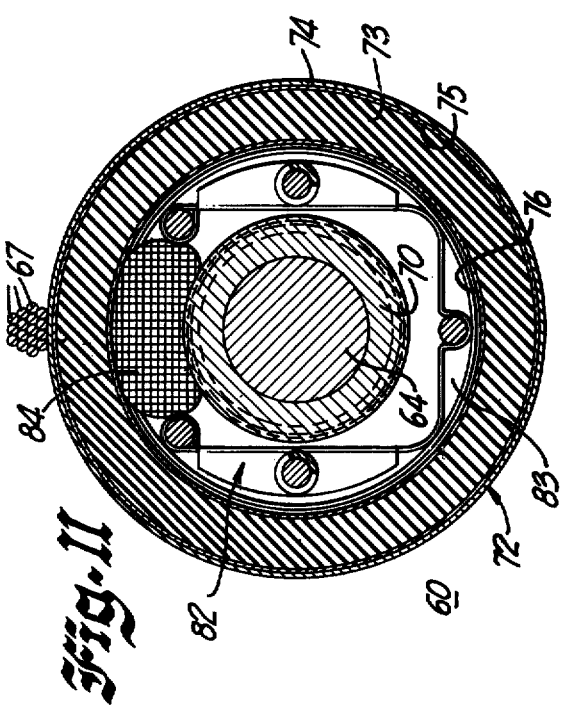
FIG. 11 is a cross sectional view of the assembly of FIG. 10 taken along line 11–11 of FIG. 10.

FIGS. 10–12 illustrate a modification of the coupling assembly adapted for joining concentric neutral type cable. More specifically, as therein illustrated, there is provided a coupling assembly 60 for connecting the adjacent ends of a pair of concentric neutral cables 61, 62. Each of the cables 61, 62 includes a central conductor 64 covered with a suitable layer of insulation 65 having inner and outer conductive shielding material on its surface to prevent electrical stressing of air adjacent the insulation. A conductive layer 66 covers the insulation 15. The cable is wound with a plurality of strands of wire defining spiral, concentric neutral strands 67.

The ends of the cables 61 and 62 are prepared in a manner similar to that heretofore described, and more specifically the insulation 65 is stripped a sufficient distance to expose the central conductors 64. Thereafter, the conductive layer 66 is stripped from the insulation 65 a sufficient distance to provide electrical insulation to the central conductor 64. Moreover, the strands of grounding wire 67 are unwound a sufficient distance to clear the cable joint, and one or more of the strands may be wound around the wire, as illustrated at 67a to secure the loose ends thereof.

A suitable retaining ring 78 and an elastomeric filler 68 are slipped over each end of the cables 61 and 62. The elastomeric filler 68 extends toward the end of the cable. Cup shaped retaining washers 83 are placed against the inner end of the elastomeric filler 68. A connector sleeve 70 is fitted over the exposed ends of the central conductor 64 and is crimped or otherwise electrically and mechanically secured thereto.

A housing 72 is provided over the entire joint, and includes an inner sleeve of insulating material 75 such as epoxy, and an outer casing 74 of suitable low resistance material such as stainless steel or the like. An outer conductive coating 75 of conductive epoxy or other suitable material covers the outer surface of the inner sleeve 73, and an inner sleeve 76 of suitable electrically conductive material, such as an epoxy conductive coating, is formed on the inner surface of the inner sleeve 73 intermediate the ends thereof and radially outwardly of the energized inner components of the joint.

The retaining rings 78 are of rigid material engaging with the conductive layer 66 on the cables 61 and 62. After assembly, the casing 74 of the housing 72 may be peened over, as illustrated at 79. The wound strand or strands 67a of the grounding strands 67 will prevent axial shifting of the rings 78 and therefore of the housing 72. The grounding strands 67 pressing against the outer casing 74 provide for grounding of the casing. The grounding strands 67 of the two cables 61 and 62 are secured together by a suitable coupling sleeve 80, here shown as of the compression type.

The elastomeric fillers 68 are held under axial pressure by a spring biasing assembly 82, which may be of any desired type, but which is shown identical to the spring biasing assembly 42 previously described. The spring biasing assembly 82 provides axial bias against the retaining washers 83 along the inner end of the elastomeric fillers 68, thereby continuously spring loading the elastomeric fillers and maintaining them in sealing and void-free interfacial relation with the cable insulation 65, the inner sleeve 73 and the core of the housing 72. A wad of copper mesh 84 inserted in the connector area of the coupling assembly 60 provides for good electrical contact between the connector sleeve 70, the spring biasing assembly 82, and the inner conductive coating 76 on the housing 72, thereby eliminating electrical gradients in the air space of the connector area.

FIGS. 13–17 illustrate a method of assembly for a coupling assembly, and is here shown with reference to a metallic shield grounding tape type of high voltage cable. A jig or jack 90, including a jack base 91, and a jack lever 92 is provided for supporting and assembling the cable joint. More specifically, the jack base 91 includes an elongated base rail 93 being provided along its upper surface with two rows of spaced apart jack holes or slots 94. Adjacent each end of the base rail 93 is provided an upwardly extending end support 95 having a somewhat U-shaped or semicircular recess in its upper edge to receive or support the respective cables 11 and 12. Also included with the jack 90 is an elongated half-round channel brace 96 which may be selectively placed over one of the cables 11 or 12, and which is provided with opposed slots 96a fitting over the free end of the end supports 95 to fix or position the brace. Also included with the jack is a somewhat U-shaped or semicircular force pad 97 which also may be placed over a selected one of the cables 11, 12, and which includes a fulcrum 97a for forcing with the lever 92. The jack lever 92 is a bifurcated rod having end portions 92a which may be placed within the slots 94 in the base rail 93 for prying against the force pad 97.

As supplied disassembled, one of the elastomeric fillers 25 is shipped within the housing 32; the other of the elastomeric fillers 25 is shipped in a filler retaining tube 98 of cardboard or other suitable disposable material, FIG. 9.

In the assembly of the cable coupler, the ends of the cable are prepared essentially as shown in FIG. 8, the central conductor 14 being exposed for a desired length, there being a short length of metallic shield grounding tape 16 exposed beyond the end of the protective jacket 17. The layer of securing tape 18 is wound on the shield grounding tape 16 to prevent unravelling of the tape 16. Thereafter, the retainers 20 are secured to the respective ends of the protective jacket 17. After the cable ends have been prepared, the left-hand cable 11 is set into the jack base. The half-round base 96 will be placed over the cable between the jack end support 95 and the assembled jacket retainer 20. If necessary, the half-round brace 96 may be fastened in place. Silicone grease is applied to the insulation, copper tape, and cable jacket up to the retainer. Thereafter, the joint housing 32 containing one of the elastomeric fillers 25 will be pushed over the greased cable end of cable 11, as shown in FIG. 13, thereby forcing the cable through the housing and into the internal elastomeric filler 25 exposing the central conductor 14 of the cable end. With the retaining washer 43 in place, the force pad 97 will be placed over the housing 32 end, and the jack lever 92 may be used to force the housing and internal elastomeric filler 25 over the cable until excessive force indicates that the elastomeric filler 25 is properly set or seated against the retainer 20.

The right-hand cable 12 may then be inserted into the jack base, as shown in FIG. 14. The half-round brace 96 will now be placed over the right-hand cable between the end support 95 and the retainer 20 of the right-hand cable. If it is necessary to hold the cable in place, the channel brace 96 may be fastened to the jack 90. Silicone grease will be placed over the insulation, copper tape, and cable jacket up to the jacket retainer of the right-hand cable 12, in like manner as with the cable 11. The elastomeric filler 25 for the right-hand cable will come enclosed within the filler retaining tube 98, FIG. 9, and with the elastomeric filler 25 still in the tube 98, the elastomer will be pushed over the greased cable end by pressing against the retaining washer 43 thereof. The force pad 97 and jack lever 92 may be used to force the elastomeric filler 25 and its enclosing retaining tube 98 over the right-hand cable until the elastomeric filler 25 is seated solidly against the retainer 20 of the right-hand cable 12.

The connector sleeve 30 may then be assembled over the exposed central conductors 14 and crimped into place.

With the cable and joint assemblies in the jack 90, and the half-round brace 96 over the right-hand cable between the jack base and support 95 and the retainer 20, the spring biasing assembly 42 may be slipped into place. To this end, the slotted slide 44 and the body 46 containing the slide assembly 45 may be inserted over the connector sleeve 30 and set into washers 43. The jack lever 92 may be used alternately to compress the springs toward the body 46 of the spring biasing assembly 42 and to align the respective retainer clips 51 into a suitable set of slots 44a to provide the desired compression to the springs. Suitable copper mesh pad 54 is fit snugly into the open upper ends of the spring biasing assembly 42 and along the length of the compression connector.

The force pad 97 is then placed over the left end of the joint housing 32, as shown in FIG. 15, and the jack lever 92 is used to force the housing 32 toward the right. As the housing 32 moves into and over the mesh pad 54, the pad may be held in place by hand or with a screwdriver, if necessary, to keep the mesh pad in place over the compression connector. Continued force with the jack lever 92 will force the housing 32 over the right-hand elastomeric filler 25, forcing the filler retaining tube 98 off the elastomeric filler 25, the housing 32 will be centered relative to the retainer at each end of the housing, and a hammer may be used to peen the housing ends snugly against the retainers. Suitable grounding through the grounding studs may be made in accordance with the desired application.

It will be understood that the right-hand elastomeric filler 25 supplied within the filler retaining tube 98 is prestressed radially, so that removal of the filler retaining tube 98 upon forcing of the housing 32 to the right will permit the elastomeric filler 25 to expand progressively radially outwardly against the inner surface of the housing components. The filler retaining tube 98, after it has been forced entirely off the elastomeric filler 25, may be removed in any convenient manner.

Thus, it will be apparent that in accordance with the present invention there has been provided an improved apparatus or jack for assembling a cable coupler of the type having a pair of tubular elastomeric insulating members under initial radial restraint released within the housing. Advantageously, the jack provides for rapid assembly of the cable coupler while providing for progressive wiping of the interfacial surfaces to assure the provision and maintenance of void-free interfaces. Moreover, the improved method likewise contributes to a reliable joint with void-free interfaces and maintenance of the sealing and void-free interfacial surfaces. Advantageously, one of the elastomeric fillers is initially restrained radially within the elongated tubular housing, and the other of the elastomeric fillers is initially restrained radially within a disposable tube or jacket. Thus, the radial restraint of the second elastomeric filler may readily and positively be transferred from the disposable tube or jacket to the joint housing.

Moreover, advantageously, the method and apparatus according to the present invention are equally applicable to most types of high voltage cable, including grounding tape types of high voltage cable and concentric neutral external strand types of high voltage cable. Advantageously, the described axial biasing permits clearance for crimping of the conductor sleeve without interference of the biasing springs. The biasing assembly may readily be inserted after the electrical and mechanical joining of the central conductors, and the load may be applied easily and safely without difficulty.

Although the present invention has been described by reference to several embodiments thereof, it will be apparent that numerous other modifications and embodiments will be devised by those skilled in the art which will fall within the true spirit and scope of the present invention.

What is claimed as new and desired to be secured by Letters Patent of the United States is:

1. A method of electrically connecting the ends of a plurality of high voltage cables comprising the steps of placing a first, elongated, tubular elastomeric member in a telescoping relationship over a portion of the end of a first cable of said plurality of cables, placing a second, elongated, dielectric member in a telescoping relationship over a portion of the end of a second cable of said plurality of cables, positioning in a first position an elongated unitary means for housing the electrically interconnected ends of said first and second cables formed by a tubular dielectric member having an inner conductive shield disposed on the inner surface of said tubular dielectric member and an outer conductive shield disposed on the outer surface of said tubular dielectric member, said housing means in said first position telescoping at least a portion of the end of one of said first and second cables, electrically interconnecting the central conductors of said first and second cables and moving said housing means from said first position to a second position, said inner conductive shield in said second position surrounding the electrically interconnected central conductors of said first and second cables and preventing the occurrence of corona at said interconnected central conductors.

2. A method as recited in claim 1 wherein said moving step includes the step of moving said housing means over said first and second members such that in said second position said housing means surrounds and contacts at least elongated portions of said first and second members.

3. A method as recited in claim 1 further comprising the steps of restraining said first member from substantial movement in at least one direction along the longitudinal axis of said first member when said housing means is positioned in said second position and restraining said second member from substantial movement in at least one direction along the longitudinal axis of said second member when said housing means is positioned in said second position.

4. A method as recited in claim 3 further comprising the steps of restraining said first member from substantial movement in a direction along the longitudinal axis of said first member opposite to said one direction when said housing means is positioned in said second position and restraining said second member from substantial movement in a direction along the longitudinal axis of said second member opposite to said one direction when said housing means is positioned in said second position.

5. A method as recited in claim 1 further comprising the step of electrically connecting a low resistance portion of said housing means to a grounded portion of said first cable and to a grounded portion of said second cable when said housing means is positioned in said second position.

6. A method as recited in claim 1 further comprising the steps of stripping an end of said first cable prior to positioning said housing means in said first position to thereby expose a predetermined length of said central conductor of said first cable to the atmosphere, to thereby expose a predetermined length of the insulating means surrounding said central conductor of said first cable to the atmosphere and to thereby expose a predetermined length of the grounded portion of said first cable to the atmosphere and stripping the end of said second cable to thereby expose a predetermined length of said central conductor of said second cable to the atmosphere, to thereby expose a predetermined length of the insulating means surrounding said central conductor of said second cable to the atmosphere and to thereby expose a predetermined length of the grounded portion of said second cable to the atmosphere.

7. A method as recited in claim 6 further comprising the steps of placing said end of said first cable having said exposed lengths of central conductor, insulating means and grounded portion above an elongated base member and bracing said end of said first cable against substantial movement along the longitudinal axis of said base member prior to positioning said housing means in said first position.

8. A method as recited in claim 7 wherein said step of positioning said housing means in said first position includes the step of applying a force along the longitudinal axis of said housing means by means of an elongated lever engageable with said base member to thereby force said housing into said first position.

9. A method as recited in claim 8 further comprising the step of placing said end of said second cable having said exposed lengths of central conductor, insulating means and grounded portion both above said base member and generally collinearly with said end of said first cable and bracing said end of said second cable against substantial movement along the longitudinal axis of said base member.

10. A method as recited in claim 9 wherein said step of moving said housing means from said first position to said second position includes the step of applying a force along the longitudinal axis of said housing means to said housing means by means of said lever engageable with said base member to force said housing means from said first position to said second position.

11. A method as recited in claim 10 further comprising the step of electrically connecting a low resistance portion of said housing means to said grounded portion of said first cable and to said grounded portion of said second cable when said housing means is positioned in said second position.

12. A method of electrically connecting a plurality of high voltage cables comprising the steps of stripping a first portion of an end of a first cable of said plurality of cables to expose a desired length of the central conductor of said first cable to the atmosphere, stripping a first portion of an end of a second cable of said plurality of cables to expose a desired length of the central conductor of said second cable to the atmosphere, placing a first, elongated, tubular, elastomeric member over a portion of said end of said first cable to thereby surround said portion with said first member, placing a second, elongated, tubular, elastomeric member over a portion of said end of said second cable to thereby surround said portion with said second member, placing an elongated unitary means for housing the electrically interconnected ends of said first and second cables formed by a tubular dielectric member having an inner conductive shield disposed on the inner surface of said tubular dielectric member and an outer conductive shield disposed on the outer surface of said tubular dielectric member in a first position over one of said first and second cables in which position said housing means surrounds a portion of said one cable, electrically interconnecting said central conductors of said first and second cables and moving said housing means from said first position to a second position in which position said inner conductive shield surrounds the electrically interconnected central conductors of said first and second cables and prevents the occurrence of corona at said interconnected central conductors.

13. A method as recited in claim 12 wherein said moving step includes the steps of moving said housing means over at least portions of said first and second members such that in said second position said housing means surrounds and contacts at least elongated portions of said first and second members.

14. A method as recited in claim 12 further comprising the steps of restraining said first member from substantial movement in at least one direction along the longitudinal axis of said first member when said housing means is positioned in said second position and restraining said second member from substantial movement in at least one direction along the longitudinal axis of said second member when said housing means is positioned in said second position.

15. A method as recited in claim 12 further comprising the step of electrically connecting a low resistance portion of said housing means to a grounded portion of said first cable and to a grounded portion of said second cable when said housing means is positioned in said second position.

* * * * *